United States Patent
Pathapati et al.

(10) Patent No.: US 11,838,328 B1
(45) Date of Patent: Dec. 5, 2023

(54) PREVENTING DATA EXFILTRATION TO UNSANCTIONED CLOUD COMPUTING SERVICES (CCS) ACCOUNTS USING CCS APPLICATION PROGRAMMING INTERFACES

(71) Applicant: Netskope, Inc., Santa Clara, CA (US)

(72) Inventors: VenkataSwamy Pathapati, Koduru Mandal (IN); Michael Koyfman, Deerfield, IL (US); Yuri Duchovny, Colts Neck, NJ (US)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 18/157,459

(22) Filed: Jan. 20, 2023

(51) Int. Cl.
*H04L 9/40* (2022.01)
(52) U.S. Cl.
CPC ............ *H04L 63/20* (2013.01); *H04L 63/083* (2013.01)
(58) Field of Classification Search
CPC .............................. H04L 63/20; H04L 63/083
USPC ........................................................ 713/153
See application file for complete search history.

(56) References Cited

U.S. PATENT DOCUMENTS

| | | | | |
|---|---|---|---|---|
| 2019/0190953 A1* | 6/2019 | Feintuch | ................. | H04L 63/10 |
| 2019/0342397 A1* | 11/2019 | Laibson | .............. | H04L 43/0817 |
| 2020/0235929 A1* | 7/2020 | Jacobs | ................. | H04L 9/3073 |
| 2021/0112059 A1* | 4/2021 | Heldman | ................. | H04L 67/10 |
| 2022/0038544 A1* | 2/2022 | Grinstein | ............ | H04L 63/0853 |
| 2022/0103980 A1* | 3/2022 | Jaquish | .................. | H04L 51/58 |

* cited by examiner

*Primary Examiner* — Anthony D Brown (57) ABSTRACT

The invention provides a method, apparatus and system for preventing exfiltration of data caused by use of an unsanctioned CCS account. The invention intercepts a communication including a request for access to data, where the communication is being transmitted between a user of the CCS, and a CCS host website, referred to as a CCS endpoint. The intercepted communication is inspected for information that is processed to obtain a CCS account identifier associated with a CCS account being used by a user of that CCS account. The CCS account identifier is further processed to access tenant defined policy information associated with the CCS account. The invention further performs actions to determine if the CCS account associated with the account identifier is unsanctioned (unpermitted) with respect to access to the particular data for which access is being requested by the user of that CCS account.

20 Claims, 9 Drawing Sheets

PUT https://82netskopetet.s3.us-east-2.amazonaws.com/dlp-content.txt HTTP/1.1
Host: 82netskopetet.s3.us-east-2.amazonaws.com
Accept-Encoding: identity
Content-Type: text/plain
User-Agent: aws-cli/1.18.223 Python/3.7.8 Windows/10 botocore/1.19.63
Content-MD5: aJc/c7b31bw3+VdiEKestA==
Expect: 100-continue
X-Amz-Date:20220912T050815Z
X-Amz-Content-SHA256: UNSIGNED-PAYLOAD        414
Authorization: AWS4-HMAC-SHA256 Credential=c77926063 8a47421d0a1/20220912/us-east-2/s3/aws_request,
SignedHeaders=content-md.5;content-type;host:x=amz-content=sha256,x=amz-date,
Signature=cb449fe741f92f6c2bebf15c7ef29be963c77926063 8a47421d0a1bb0c57159cf
Content-Length: 667
X=NS=TENANT=ID: 1016     416

DLP_PCI = 'Client Bank Account # Credit Card # In Agnes McCartney 6011125223709063 \n Sandra Gooch 5116845485280950 In Alex Hunt 4126246328149117 3001362232222912 \n Ben Lawton checking account: 9046127-432
3413038563 08768'

DLP_PII = 'NAME SSN Status Harvey Brier 756-04-5361 RETIRED Harvey Brier 756-04-5361 RETIRED Harvey Brier 756-04-5361 RETIRED'

DLP_Profanity = 'BASTARD BITCH BLOODY BOLLOCKS'

DLP_PHI = 'NAME SSN Status Harvey Brier 756-04-5361 RETIRED Harvey Brier 756-04-5361 RETIRED'

432
POST https://sts.amazonaws.com/ HTTP/1.1
Host: sts.amazonaws.com
Accept-Encoding: identity
Content-Type: application/x-www-form-urlencoded; charset=utf-8
User-Agent: aws-cli/1.18.223 Python/3.7.8 Windows/10 botocore/1.19.63   434
X-Amz-Date: 20220912T055414Z
Authorization: AWS4-HMAC-SHA256 Credential= AKIARIM2QA72FXADMLG3/us-east-1/sts/aws4_request,
SignedHeaders=Content-type;host;x-amz-date,
Signature= a8389f829c9e8a6f48e6a993aca29dSec6464c692ac9679558d2a04e7eac89662
Content-Length: 75
                                                                    436

Action-GetAccessKeyInfo&Version=2011-06-15&AccessKeyId=c77926063824 7421d0ai

Figure 4C

```
442
HTTP/1.1 200 OK
x-amzn-id-RequestId: ac2b449b-920f-483f-ac0c-dec880ca3e7f
Content-Type: text/xml
Content-Length: 303
Date: Mon, 12 Sep 2022 05:54:15 GMT <GetAccessKeyInfoResponse xmlns=http://sts.amazonaws.com/doc/2011-06-15/>
  <GetAccessKeyInfoResult>
    <Account>086760228850</Account>    446
  </GetAccessKeyInfoResult>
  <ResponseMetadata>
    <RequestId>ac2b449b-920f-483f-ac0c-dec880ca3e7f</RequestId>
  </ResponseMetadata>
</GetAccessKeyInfoResponse>
```

PREVENTING DATA EXFILTRATION TO UNSANCTIONED CLOUD COMPUTING SERVICES (CCS) ACCOUNTS USING CCS APPLICATION PROGRAMMING INTERFACES

BACKGROUND

Cloud computing service providers such as Amazon Web Services™ (AWS), Google Cloud Platform™ (GCP), and Microsoft Azure™ provide convenient, on-demand network access to a shared pool of configurable computing resources (e.g., networks, servers, storage, applications, and services) that can be rapidly provisioned in exchange for periodic payments that are based upon pay-as-you-go pricing. Entities that contract with cloud computing service providers are referred to as tenants of a particular cloud computing service provider.

Some cloud computing services, such as AWS, require different types of security credentials to access the services provided. For example, a username and password may be required for accessing a management interface, such as an AWS Management Console, while an access key identification value, also referred to herein as an access key ID or as an access key, is required for making programmatic application programming interface (API) calls, or for entering commands from a Command Line interface, or for performing actions via a Power Shell or via other Tools provided by the cloud computing service.

The subject matter in this section merely represents a general context associated with the invention. The subject matter discussed in this section should not be assumed or interpreted to be prior art merely as a result of its mention in this section.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

The invention described herein addresses a threat of data exfiltration, being a breach of protection of data that is processed by a cloud computing service (CCS), such as AWS, GCP, and Azure, where such data exfiltration is caused by activities of unsanctioned accounts of users of tenant organizations that contract with and use the cloud computing service. These accounts are also referred to herein as CCS unsanctioned accounts.

The invention employs a proxy server within a communications network to intercept and inspect communications that are transmitted between a CCS and tenant (user) accounts of the CCS, also referred to herein as CCS related communications. This proxy server operates as a proxy component included within a network security system (NSS).

A CCS account is associated with an CCS tenant and a user associated with that tenant. A tenant is typically an organization including multiple users that contracts with and makes use of services provided by the CCS. There can be multiple CCS accounts associated with a tenant, where each of these CCS accounts is associated with at least one user within that organization.

Some of these CCS accounts are sanctioned (permitted) to either access and optionally copy (share) data processed by the CCS, while other of these CCS accounts are unsanctioned (not permitted), meaning they these CCS accounts are not permitted to access, copy (share) data that is processed by the CCS.

Ordinarily, each CCS related communication includes CCS credentials of a tenant user that are required to access services of the CCS, and excludes information identifying a CCS account that is associated with the tenant user. These credentials can include a set of CCS long term access keys or a set of CCS short term access keys.

Figure 1:
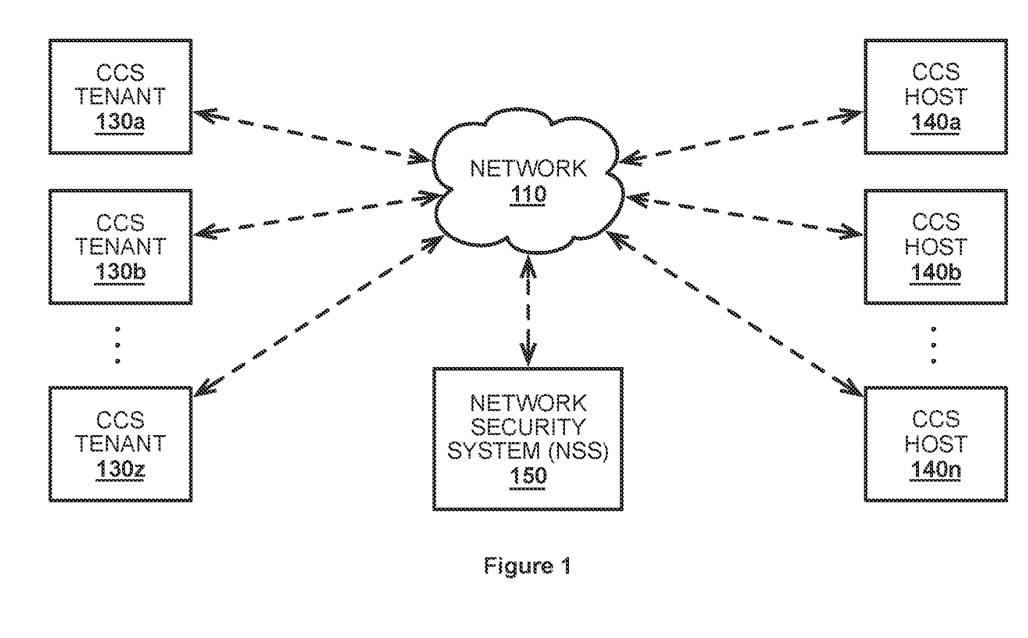
FIG. 1 illustrates a conceptual block diagram of a network security system (NSS) that includes a proxy server functionality, also referred to herein as a proxy module or proxy component, and that is configured to intercept communications between one or more cloud computing services (CCS) and one or more tenants (CCS tenants) of those cloud computing services.

FIG. 1 illustrates a conceptual block diagram of a network security system (NSS) 150 which is configured to act as a proxy component, and that is configured to intercept communications between one or more cloud computing services (CCSs) having one or more CCS host servers 140a-140n (located on the right hand side of this figure), and one or more tenants 130a-130z of those cloud computing services (located on the left hand side of this figure). As shown, a CCS tenants 130a-130z are in communication with one or more CCS host servers 140a-140n, also referred to herein as hosts 140a-140n, via a communications network 110.

The communications network 110, which is also referred to herein as a network 110, is preferably a publicly accessible network, such as the Internet. The network security system (NSS) 150 is configured for being in communication with both the CCS tenants 130a-130z and the CCS hosts 140a-140n, and is further configured to act (operate) as a proxy, also referred to herein as a proxy component, and configured to intercept communications between the computing service CCS tenants 130a-130z and the CCS hosts 140a-140n, and vice versa.

Figure 2:
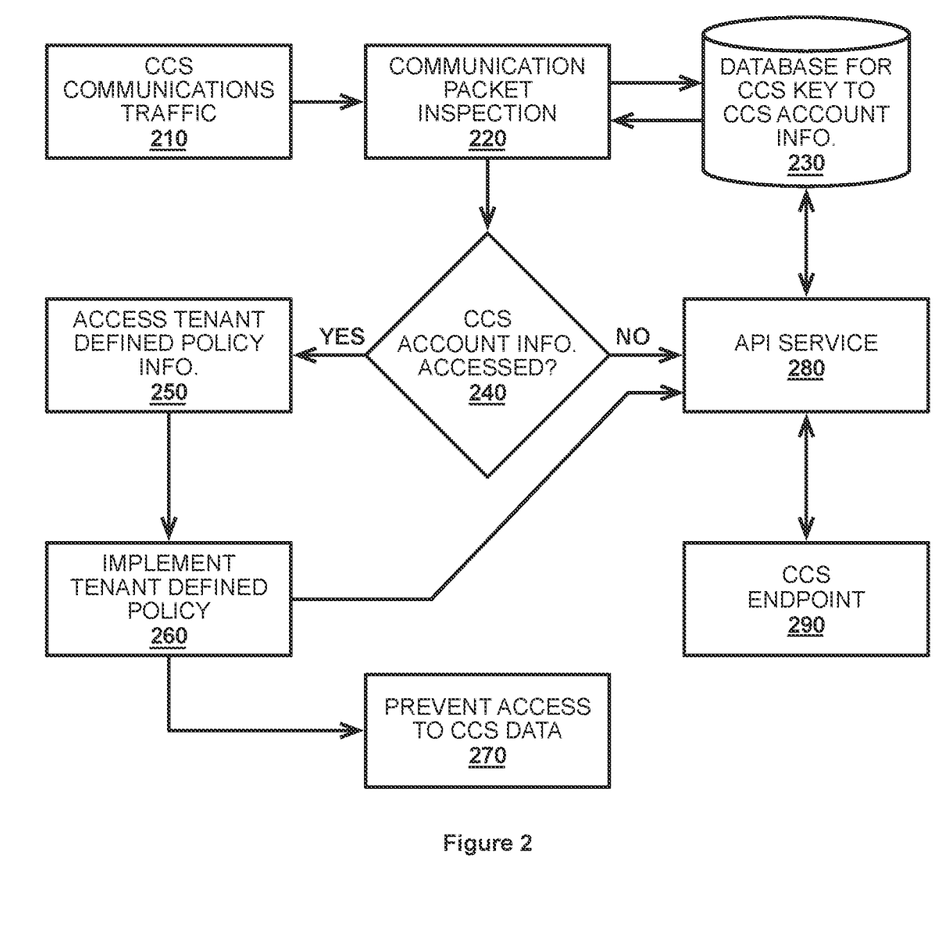
FIG. 2 illustrates a workflow diagram illustrating intercepting and processing cloud computing service communications traffic in accordance with the invention.

FIG. 2 is a flowchart illustrating how CCS communications traffic is processed by the system of the invention. As shown, CCS communications traffic 210 being transmitted over a communications network between CCS tenants and CCS hosts is intercepted and inspected by a network proxy server 220, which is included within a network security system (See FIG. 3A). Upon inspection of each CCS communication by the network proxy server 220, which is communicated in the form of one or more data communication packets, the network proxy server 220 identifies the CCS credentials within a CCS communication (i.e., credentials required for access to the services provided by the CCS) and exercises a CCS application programming interface (API), by performing a function call, to identify a CCS tenant (user) account that is associated with the CCS credentials.

A tenant 130*a*-130*z*, being an organization that contracts for use of the CCS's services, can define its own policies with respect to the tenant organization's use of those services. Such tenant defined policy information, which is also referred to herein as tenant defined policy (TDP) information, is obtained by the proxy server of the network security system (NSS) 150 (See FIG. 1), by determining the identity of the AWS account that is associated with an intercepted and inspected communication.

One way to determine such CCS account information involves exercising an application programming interface (API) of the CCS. A CCS endpoint, which provides access to the CCS's services, provides a set of APIs, which include an API to retrieve access key information. In AWS the API is named "get_access_key_info( )". The access key retrieval function call is designed to process a CCS access key as an input parameter, and designed to output tenant (user) CCS account information that is associated with the particular CCS access key specified as an input parameter to the function call.

Another way to determine such CCS account information is to store into a database 230, an association between a CCS access key that is included within a particular CCS communication and account information of a tenant user. The tenant user being a user within a tenant organization that has transmitted that same communication undergoing proxy server inspection 220.

The database 230 is employed to store such an association between a CCS access key and CCS account information of a tenant user. Preferably, this database 230 is a local (in-memory) type of database, such as Redis database 230. Alternatively, this database 230 can be another type of in-memory database or another type of database or data storage subsystem altogether.

If CCS account information is accessed (obtained) 240 from CCS communication as a result of the inspection by the proxy server 220, the CCS account information is employed to access tenant defined policy (TDP) information 250. This TDP information 250 indicates whether a tenant user associated with the account information is sanctioned (permitted) or unsanctioned (not permitted) to access and/or copy data, where such data could be accessed or copied as a result of the CCS receiving and processing the communication that is being inspected.

Upon implementing (acting upon) the TDP information 260, if the tenant user of the communication is sanctioned, meaning that the tenant user is permitted to access and/or copy data that could be accessed or copied by the tenant user as a result of the CCS receiving and processing the communication being inspected, then the communication is relayed (transmitted) to its original destination, where the original destination is likely that of a CCS endpoint 290.

In accordance with the invention, an API service 280 is designed to interface with a software development kit (SDK) for the CCS, in order to perform functions including accessing tenant user account information from a CCS endpoint.

However, upon implementing (acting upon) the TDP information 260, if the tenant user transmitting the communication is not sanctioned (not permitted) to access and/or to share data that could be accessed or copied by the tenant user as a result of the CCS receiving and processing the communication being inspected, from the CCS endpoint 290, then the communication is prevented from accessing CCS data by being prevented from being further transmitted to CCS (270), and this communication is not relayed (transmitted) to its original destination, where the original destination is expected to be that of a CCS endpoint 290.

Optionally, a communication including a negative acknowledgment, is transmitted by the NSS 150 back to an original source network address, of the CCS communication being inspected, as a result of the decision by the NSS 150 to prevent access to CCS data 270 by this received and inspected CCS communication.

Figure 3A:
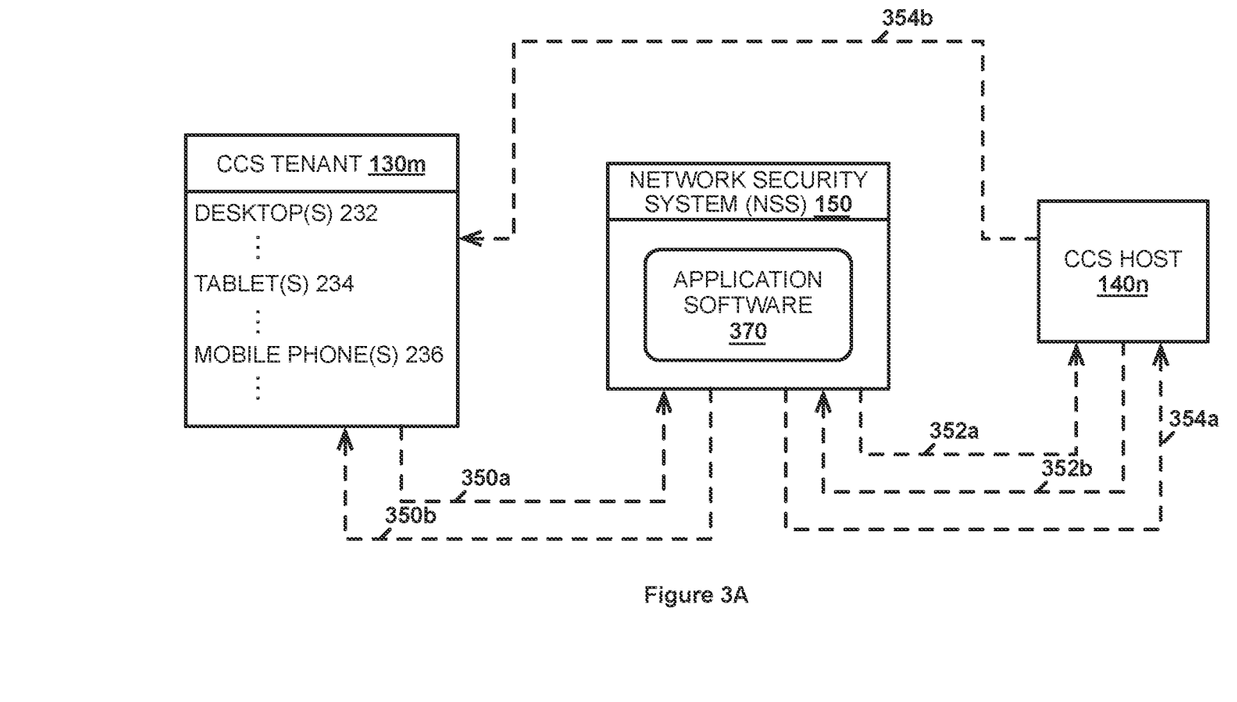
FIG. 3A illustrates a block diagram of example communications between a CCS tenant, a network security system (NSS), and a CCS host server.

FIG. 3A illustrates a block diagram of an exemplary embodiment of the invention with respect to communications being transmitted between a CCS tenant 130*m*, the network security system (NSS) 150, and the CCS host 140*n*. As shown, a CCS tenant 130*m* transmits a first communication 350*a* to the CCS host 140*n*.

However, in this example scenario, this first communication 350*a* is instead intercepted by a proxy server module (PSM) executing within the network security system (NSS) 150, prior to this communication 350*a* being received by CCS host 140*n*.

If it is determined by the NSS 150 that this communication 350*a* includes a CCS request to access data from CCS host 140*n*, and a CCS account that is associated with the first communication 350*a* is determined by the NSS 150 to be permitted (sanctioned) to access the data that is requested to be accessed, then the NSS 150 relays the communication 350*a*, including that CCS request, by transmitting communication 354*a* to the intended destination of the first communication 350*a*, being CCS host 140*n*, as if the communication 350*a* was not intercepted by the NSS 150. CCS host 140*n* processes the communication 354*a* and responds to the communication 354*a* by transmitting communication 354*b* to CCS tenant 130*m*.

Alternatively, if it is determined by the NSS 150 that this communication 350*a* includes a CCS request to access data from CCS host 140*n*, and a CCS account that is associated with the first communication 350*a* is determined by the NSS 150 to be not permitted (not sanctioned) to access the data that is requested to be accessed, then the NSS 150 performs action to prevent access to the data being requested by preventing the first communication 350*a* from being received by CCS host 140*n*.

Essentially, the NSS 150 blocks the first communication 350*a* from reaching and being received by CCS host 140*n*, being its original destination, and effectively blocks access to the CCS data being requested. And further, the NSS 150 transmits a communication 350*b* indicting to the CCS tenant 130*m* user, that the request for access to the CCS data is being denied.

The process of determining whether a CCS account that is associated with the first communication 350*a* is or is not permitted (sanctioned) to access the CCS data being requested, involves accessing additional information from CCS host 140*n*, via an exchange of communications 352*a*-352*b*. This exchange of communications 352*a*-352*b* returns a CCS account identifier (ID), which is employed to access tenant defined policy (TDP) information, which indicates whether the CCS account of the request, is or is not sanctioned (permitted) to access such data. This process of determining whether a communication including a request for data is or is not permitted (sanctioned) to access such data via CCS host 140*n*, is described in more detail in association with FIG. 5.

As for the processing of communication 350a, this communication 350a is a digital communication that is encoded as a series of binary bits that are transmitted over the communications network 110. This communication 350a is received via at least one of a set of devices under the control of at least one device driver that interoperates with an operating system that is executing within computing apparatus of the NSS 150. Software that is collectively referred to herein as the application software 370 includes executable instructions for one or more central processing unit(s) (CPUs) of the NSS 150 that are configured to direct the NSS 150 to perform functions in accordance with the invention.

These functions include the actions of intercepting communications being transmitted towards a destination that is a CCS endpoint, and from a CCS tenant for which tenant defined policy is being enforced by the NSS 150, inspecting and processing those communications for the purpose of performing tenant defined policy enforcement where applicable, as will be further described in the following text of this specification.

Figure 3B:
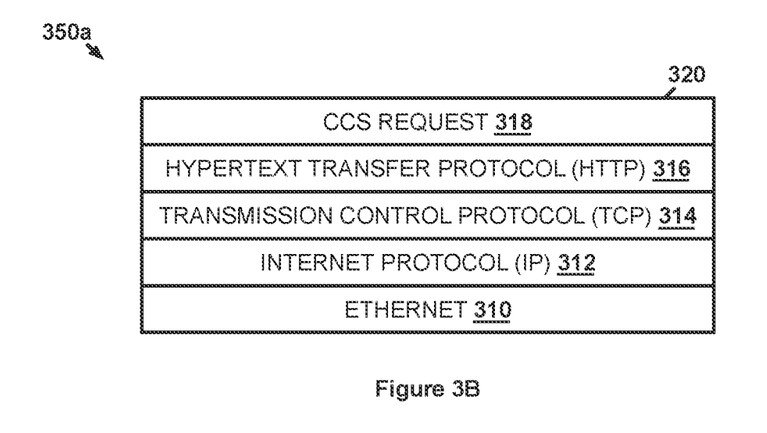
FIG. 3B illustrates an example structure of a first communication between the CCS tenant and the network security system of FIG. 2.

FIG. 3B illustrates an example structure of a first communication 350a between CCS tenant 130m and the network security system (NSS) 150 (proxy component) of FIG. 2. As shown, the structure (content) of the communication 350a can be represented as a stack 320 of communication protocol layers, the stack being a plurality of communication protocol layers that collectively carry payload information as data, and which is also referred to herein as payload data.

For the example communication scenario depicted in FIG. 2, the communication 350a is received by the NSS 150 (proxy component). In this circumstance, NSS 150 (proxy component) resides as a node within the network 110 and where this node is connected to and in communication with the network 110 via an Ethernet cable. The Ethernet cable is also connected to an Ethernet communications device residing within the NSS 150 (proxy component).

In this circumstance, the communication 350a over the network 110 is carried from the network 110 to the NSS 150 (proxy component) by one or more Ethernet packet(s) via an Ethernet cable. The Ethernet packet(s) are represented by an Ethernet communications protocol layer 310 within a communications protocol stack 320.

In this circumstance, the Ethernet layer 310 carries an Internet Protocol (IP) communications packet 312, which in turn carries a Transmission Control Protocol (TCP) communications packet 314, which carries a Hyper Text Transfer Protocol (HTTP) communications packet 316, which carries CCS request 318. These packets 310-318 are being communicated over the network 110 inside of the communication 350a. Each packet is represented as a set of binary bits with a superset of binary bits embodying the entire communication 350a.

CCS request 350 is the payload content of this communication 350a. The NSS 150 processes and parses the layers of this communication protocol stack 320 within this communication 350a, in order to separate the payload content, being CCS request 318, from the other portions of this communication 350a, as represented by this communication protocol stack 320.

FIGS. 4A-4D each illustrate a representation of a payload content of each of a plurality of communications between CCS tenant 130m, NSS 150 and CCS host 140n. In this example, the CCS is AWS and scripts 400a-d are applicable to AWS. Scripts for other CCS providers may use different syntax to achieve similar results.

Figure 4A:
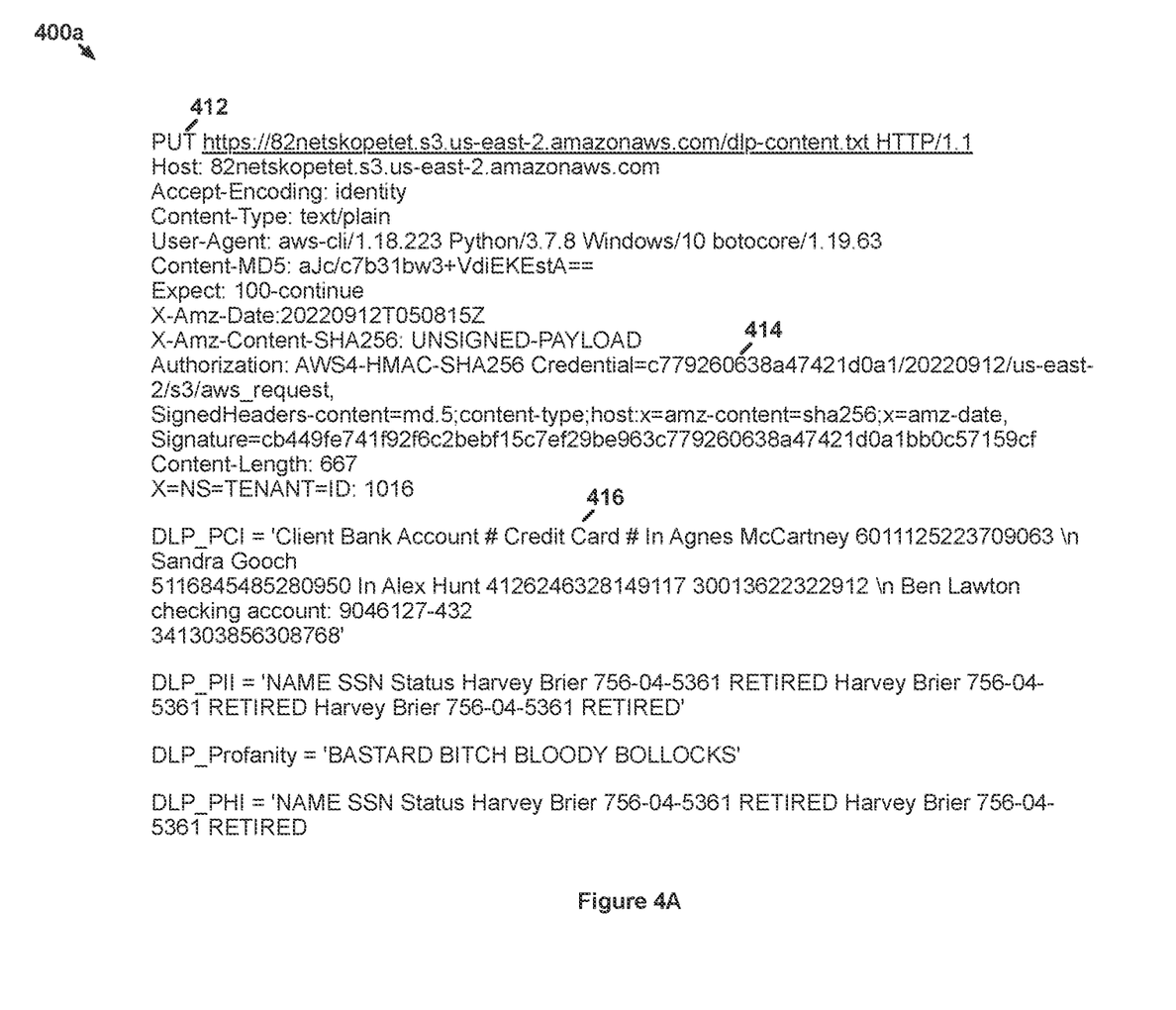
FIGS. 4A-4D illustrate a representation of content of a set of communications between the CCS tenant, the network security system (NSS) and the CCS host server.

FIG. 4A illustrates a human readable script 400a, also referred to herein as AWS script, that represents the content of the payload (payload content) of the HTTP request communication 350a, that is being communicated from the CCS tenant 130m to an A CCS host 140n. This communication 350a includes a destination address of the CCS host 140n. This destination address is represented as an Internet Protocol (IP) address. The CCS host 140n is associated with the Internet address amazonaws.com. Instead of this communication 350a being delivered to and received by the CCS host 140n, this communication 350a is instead being intercepted and received by the NSS 150, while the NSS 150 is acting as a proxy (proxy component) for the CCS host 140n.

Note that the communication 350a is actually being transmitted by a user within an organization of users that is associated with the CCS tenant 130. For example, the tenant may be a company, such as an accounting firm, associated with 25 users and 40 different devices. These devices including desktop computers 232, tablets 234 and mobile phones 236. Some of the users of this organization may access Amazon Web Services (AWS) using one of a plurality of devices.

As shown, this script includes a directive for an Hyper Text Transfer Protocol (HTTP) PUT request 412, which is being employed to communicate (upload) financial information to the CCS host 140n, which employs HTTP to communicate with client devices and is also referred to herein as an HTTP host server. A HTTP PUT request 412 is caused to be transmitted by invocation (execution) of an HTTP PUT method, which is employed to create or replace a resource on an HTTP host server. This script also includes a Credential value 414, which is equivalent to an Access Key value (See FIG. 4C), that is associated with the sender of this communication 350a, where the sender is a particular user that is a member of an organization of the CCS tenant 130m.

Note that at least the Credential value 414 is shown as being equal to a value of c779260638a47421d0a1. This value is a contrived value that herein serves just as an example, and this value is not a known to be an actual AWS Credential or Access Key value. This value is contrived to protect against revealing an actual AWS Credential or AWS Access Key value, while serving as an example of how to use such a value herein.

Also notice that this script includes financial information 416, that may be of a sensitive nature, and that may not have permission to be uploaded to the CCS host 140n by this particular user that is associated with the Credential value 414. Such lack of permission is in accordance with a security policy of this particular CCS tenant 130m.

Figure 4B:
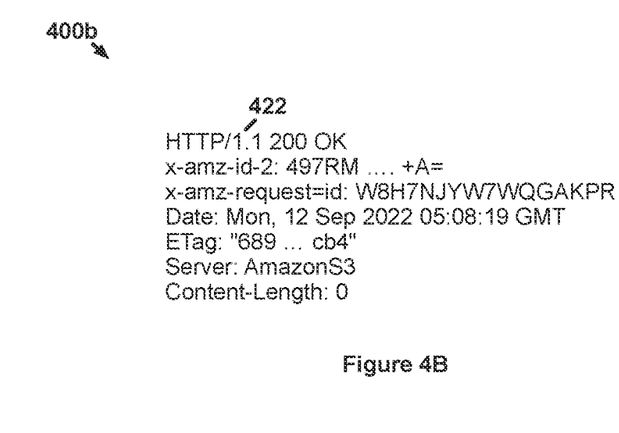

FIG. 4B illustrates a human readable AWS script 400b that represents payload content of an HTTP response communication 350b, that is being transmitted by the NSS 150 to the CCS tenant 130m in response to the NSS 150 receiving the communication 350a from the CCS tenant 130m.

Within this communication 350b, there is an HTTP status code 422 that is equal to the value of 200, indicating successful receipt of the communication 350a. However, note that the communication 350a was transmitted by the CCS tenant 130m while including a destination address of the CCS host 140n, so that it would be received by the CCS host 140n.

However, this communication 350a was instead intercepted and received by the NSS 150 acting as a proxy, substituting for CCS host 140n. However and preferably, there is no indication from within this response communication 350b, that the request communication 350a was not received by the CCS host 140n.

Figure 4C:
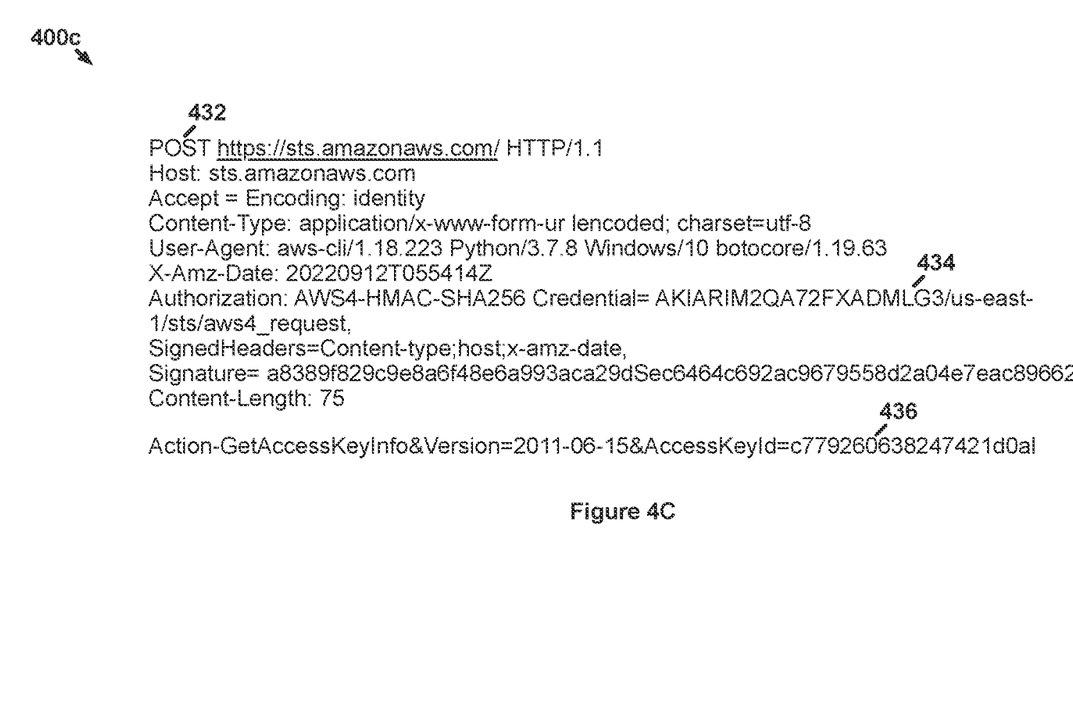

FIG. 4C illustrates a human readable AWS script 400*c* that represents payload content of the HTTP request communication 352*a*, that is being communicated from the NSS 150 to the CCS host 140*n*. This communication 350*a* includes a destination address that is associated with amazonaws.com, being that of the CCS host 140*n*. This communication is being received by the CCS host 140*n*. Note that the communication 352*a* is configured to gather information regarding the AWS account identification that is associated with the communication 350*a* being transmitted from the CCS tenant 130*m* and to the CCS host 140*n*, and intercepted by the NSS 150.

As shown, this script includes a directive for transmission of a HTTP POST request 432, which is transmitted by invocation (execution) of an HTTP POST method that is employed to create a subordinate resource on an HTTP host server (e.g., CCS host 140*n*). This AWS script 400*c* also includes an access key identification value 436, being equal to a value of c779260638a47421d0a1, that is equivalent to an Access Key value 414 that is shown in FIG. 4A, and that is associated with the original sender of this communication 350*a*, being the CCS tenant 130*m*.

Note that at least the Credential value 434 is shown as being equal to a value of AKIARIM2Q . . . , and which represents a Credential of the NSS 150 and not of the CCS tenant 130*m*, is a contrived value, and not a known to be an actual AWS Credential or Access Key value. This value is contrived to protect against revealing an actual AWS Credential or AWS Access Key value, while serving as an illustrative example of such a value herein.

Also note that this script specifies invocation of an AWS Action, the Action being invocation of an AWS application programming interface (API) request type, the request type being named as the GetAccessKeyInfo( )request. The GetAccessKeyInfo( )request is transmitted over a network with a parameter equal to the Access Key value 414 associated with the CCS tenant 130*m*. The GetAccessKeyInfo request returns account information that is associated with the Access Key value 414 of the CCS tenant 130*m*.

Figure 4D:
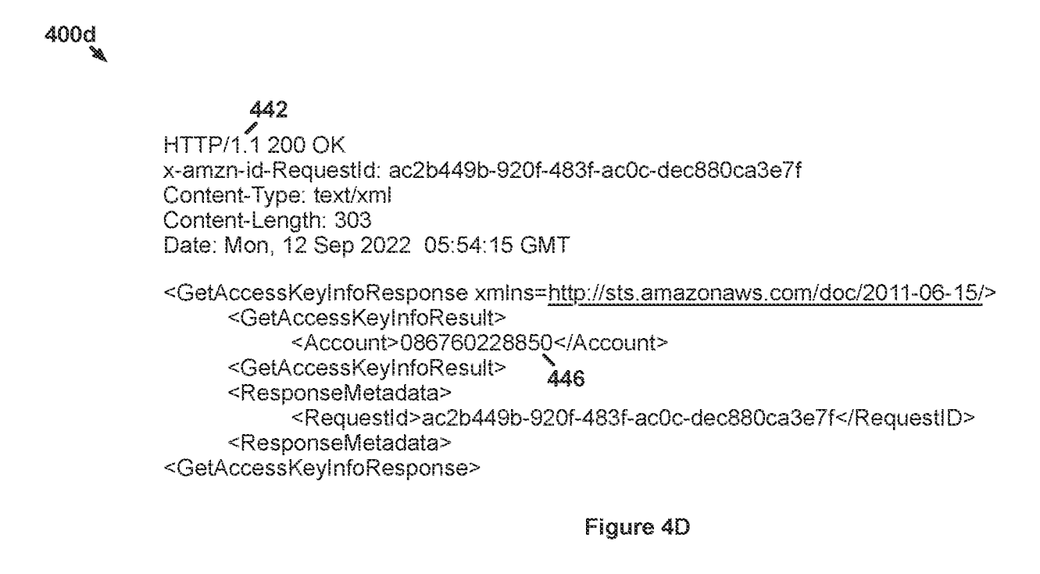

FIG. 4D illustrates a human readable script 400*d* that represents payload content of an HTTP response communication 352*b*, that is being transmitted by the CCS host 140*n* to the NSS 150.

Within this communication 352*b*, there is an HTTP status code 442 that is equal to the value of 200, indicating successful receipt of the communication 352*a* by the CCS host 140*n*.

Notice that the script for this communication includes a portion that is formatted as extended markup language (XML), and within this portion, there is Account information, being an AWS account identifier (ID) 446 that has a value equal to 086760228850.

Figure 5:
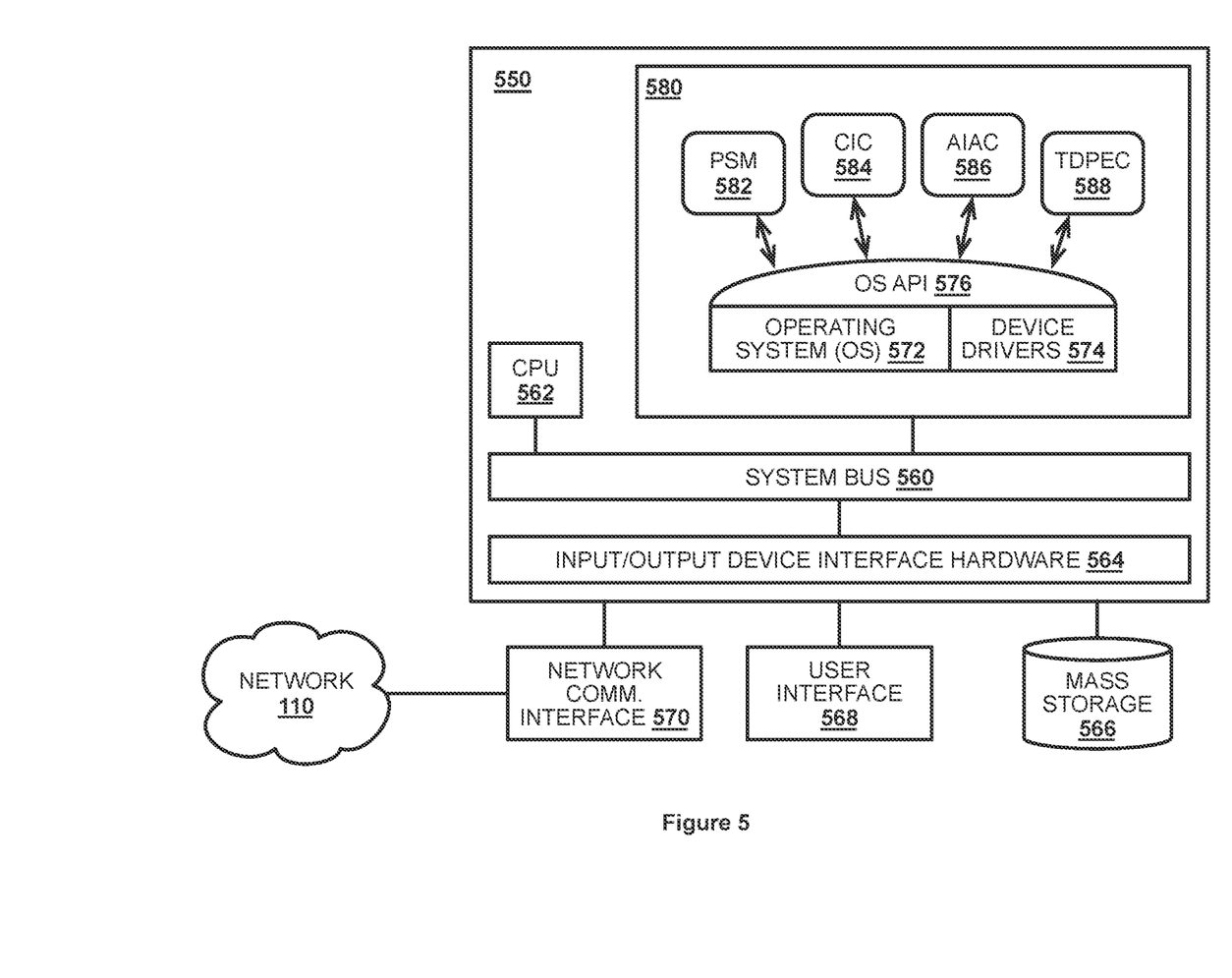
FIG. 5 illustrates a simplified representation of hardware and software residing within an exemplary computer system.

In some embodiments of the invention, the AWS Tenant Defined Policy Enforcement Component (TDPEC) 588 of FIG. 5, employs the AWS account identifier 446 to determine a value of a tenant user identifier which identifies a particular user within the organization of the CCS tenant 130*m*. This is the user of the tenant organization that transmitted the communication 350*a*. With the user identifier, the TDPEC 588 of FIG. 5 searches tenant defined policy (TDP) information, that is accessible to the NSS 150, to access tenant defined policy that is associated with that tenant user identifier, associated with the of the CCS tenant 130*m*.

The tenant defined policy (TDP) information applies to the users within the organization of the CCS tenant 130*m*. Such TDP information reveals what permissions each user has with respect to performing various types of actions whiles interacting with the CCS host 140*n*.

Although Amazon Web Services (AWS) can define its own policy, this tenant defined policy (TDP) information is instead determined by the organization of the CCS tenant 130*m*, and not determined by Amazon Web Services. Such TDP information includes information regarding whether the user of the organization of the CCS tenant 130*m* is permitted (sanctioned) to access, transfer, upload or download financial information, such as the credit card information that is included within the communication 350*a* of FIG. 4A.

If permitted, then the TDPEC 588 transmits the communication 354*a* to the CCS host 140*n*, representing communication 350*a* as if the communication 350*a* was not previously intercepted by the NSS 150 after it was first transmitted by the CCS tenant 130*m*. If not permitted, then the TDPEM prevents the communication 350*a* from reaching and being received by the CCS host 140*n*, being the original destination of the communication 350*a*. The NSS 150 transmits a negative acknowledgement communication 350*b*, to the CCS tenant 130*m*, with respect to the previously transmitted communication 350*a* from the CCS tenant 130*m*.

FIG. 5 illustrates a simplified representation of hardware and software residing within an exemplary computer system 550. NSS 150 may be implemented in a computer system 550.

As shown, the computer system 550 includes at least one system bus 560 which is electronically connected to at least one central processing unit (CPU) 562, which is also referred to herein as a computing processor 562. The computer system 550 also includes random access memory (RAM), which provides a physical memory address space for executing software, which enables the operating system 572 to allocate and manage virtual address space (virtual memory) 580 for storage and execution of software instructions within the computer system 550. The operating system 572 includes device drivers 574, which like the operating system 572, is embodied a set of CPU executable instructions, that are configured to direct operations of the hardware of this computer system 550.

Input/output device interface hardware 564 is also electronically connected to the system bus 560 and is employed for performing transfer (input and output) of data via various hardware components, including such as a mass storage device component 566, a user interface hardware component 568, and a network communications interface hardware component 570.

The mass storage device 566, can be implemented as flash memory, a solid state drive, a mechanical hard drive, or other non-volatile data storage device. The user interface hardware component 568 can collectively include a display and input devices including, for example, liquid crystal display (LCD) screen with a mouse and a keyboard. The network communications interface hardware component, which is also referred to herein as network communications hardware 570 or as the network communications component 570, is configured to have an electronic connection to the communications network 110, to enable communication of data between the computer system 550 and the communications network 110.

Within the virtual address space 580, a proxy software module (PSM) 582, also referred to herein as the proxy server or as a proxy component, includes CPU executable instructions that direct the network communication interface hardware 570 to intercept and capture (copy) a communication of interest into the virtual address space 580 of this computer system 550. The communication of interest is stored in memory as a series of digital bits, and the communication includes a CCS request to access data that is potentially accessible via a CCS from a particular CCS account.

A communication inspection component (CIC) 584 is a software module that inspects the communication of interest and extracts a CCS access key from the communication of interest. Account information access component (AIAC) 586 is a software module that converts a CCS access key to a CCS account identifier, where the CCS account identifier refers to a CCS account.

A tenant defined policy enforcement component (TDPEC) 588 is a software module that converts the CCS account identifier to a collection (set) of tenant defined policy information that is associated with the referred to CCS account, to determine if the AWS account is permitted (sanctioned) to access data as requested within the communication of interest. Permission is determined by the TDPEC exercising an API that performs a function call of the access key retrieval function, which communicates with the CCS endpoint, being CCS host 140*n*.

The access key retrieval function returns a CCS account identifier (ID) which is then employed to access tenant defined policy (TDP) information that is associated with the CCS account referred to by the CCS account identifier. This function accesses the CCS account information including the CCS account identifier from CCS host 140*n* via transmission of the communications 352*a* and 352*b* respectively (See FIG. 3A).

The TDP information is preferably accessed from and stored within an in-memory data set or database for rapid retrieval by the TDPEC 588. Alternatively, the TDP information can be retrieved from mass storage 566 residing local to the NSS 150 or retrieved from other computing systems via network communication.

If permitted, the TDPEC 588 transmits the communication of interest to its intended destination, being CCS host 140*n*, as if it was not intercepted by the NSS 150. This re-transmission is represented by the communication 354*a* (Shown in FIG. 3A). After processing the communication, CCS host 140*n* then transmits a response communication to the source address of the communication of interest, being that of CCS tenant 130*a*, as represented by communication 354*b*.

However, if not permitted, the TDPEC transmits a communication back to the source address of the communication of interest, being CCS tenant 130 (Shown in FIG. 3A) to negatively acknowledge and to indicate an absence of processing of the CCS request to access data within the communication of interest, via communication 350*b*. Essentially, any processing of the CCS request is blocked by the NSS 150.

The aforementioned discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

What is claimed is:

1. A computer-implemented method for preventing exfiltration of data via an unsanctioned cloud computing service (CCS) tenant account, the method comprising:
    acting as a network address proxy and receiving a communication that is transmitted from a user of a CCS account with a CCS, the communication comprising a request for obtaining access to data that is accessible through use of the CCS;
    inspecting the communication and obtaining at least one access key from the communication;
    processing the at least one access key to obtain a CCS account identifier that is associated with the CCS account; and
    accessing a tenant defined policy as applied to the CCS account identifier and enforcing the tenant defined policy as applied to the CCS account, the enforcing the tenant defined policy comprising:
        determining the CCS account is unsanctioned with respect to obtaining access to the data; and
        performing one or more actions in accordance with the tenant defined policy to prevent exfiltration of the data via the CCS account based on the determination that the CCS account is unsanctioned.

2. The computer-implemented method of claim 1, wherein the communication is a digital communication that is transmitted over a public communications network.

3. The computer-implemented method of claim 1, wherein the at least one access key is a short-term temporary access key provided by a security token service for the CCS.

4. The computer-implemented method of claim 1, wherein the at least one access key is included within a set of long-term access keys provided via login to a CCS console.

5. The computer-implemented method of claim 1, wherein the processing the at least one access key includes communication with a security token service endpoint for the CCS to obtain the CCS account identifier.

6. The computer-implemented method of claim 1, wherein the processing the at least one access key employs exercise of a security token service endpoint software development kit (SDK) for the CCS to obtain the CCS account identifier.

7. The computer-implemented method of claim 1, wherein the processing the at least one access key employs performing an access key retrieval function call of an Application Programing Interface (API) to obtain the CCS account identifier.

8. The computer-implemented method of claim 1, wherein the processing the at least one access key employs a database for obtaining account information that is associated with the at least one access key.

9. The computer-implemented method of claim 8, wherein the database is an in-memory database.

10. The computer-implemented method of claim 9, wherein the in-memory database is implemented as a Redis database.

11. A system for preventing exfiltration of data to a user of an unsanctioned cloud computing service (CCS) tenant account, the system comprising:
    one or more processors; and
    a memory having stored thereon instructions that, upon execution by the one or more processors, cause the one or more processors to:
        receive, with a proxy component, a communication from a user of a CCS account with the CCS, wherein the communication comprises a request for obtaining access to data that is accessible through use of the CCS;

inspect, with a communication inspection component (CIC), the communication and obtain at least one access key from the communication;

process, with an account identification access component (AIAC), the at least one access key and obtain a CCS account identifier that is associated with the CCS account; and access, with a tenant defined policy enforcement component (TDPEC), a tenant defined policy as applied to the CCS account and enforce the tenant defined policy as applied to the CCS account, the enforcing comprising:

determining the CCS account is unsanctioned with respect to obtaining access to the data; and performing one or more actions in accordance with the tenant defined policy to prevent unsanctioned exfiltration of the data via said CCS account based on the determination that the CCS account is unsanctioned.

12. The system of claim 11, wherein the communication is a digital communication that is transmitted over a public communications network.

13. The system of claim 11, wherein the at least one access key is a short-term temporary access key provided by a security token service for the CCS.

14. The system of claim 11, wherein the at least one access key is included within a set of long-term access keys provided via login to a CCS console.

15. The system of claim 11, wherein the instructions to process the at least one access key comprises instructions that, upon execution by the one or more processors, cause the one or more processors to exchange communications with a security token service endpoint of the CCS to obtain the CCS account identifier.

16. The system of claim 11, wherein the instructions to process the at least one access key comprises instructions that, upon execution by the one or more processors, cause the one or more processors to employ exercise of a security token service endpoint software development kit (SDK) for the CCS to obtain the CCS account identifier.

17. The system of claim 11, wherein the instructions to process the at least one access key comprises instructions that, upon execution by the one or more processors, cause the one or more processors to call an access key retrieval function to obtain the CCS account identifier.

18. The system of claim 11, wherein the instructions to process the at least one access key comprises instructions that, upon execution by the one or more processors, cause the one or more processors to employs a database to obtain account information that is associated with the at least one access key.

19. The system of claim 18, wherein the database is an in-memory database.

20. The system of claim 19, wherein the in-memory database is implemented as a Redis database.

* * * * *